Nov. 16, 1937.   J. W. KELLER   2,099,403
SPLIT ACTION TABLET
Filed Nov. 24, 1934

INVENTOR
Joseph Walter Keller
BY
Augustus B. Stoughton
ATTORNEY.

WITNESS:

Patented Nov. 16, 1937

2,099,403

UNITED STATES PATENT OFFICE 2,099,403

SPLIT ACTION TABLET

Joseph Walter Keller, Merion, Pa., assignor to Pratt Food Company, Philadelphia, Pa., a corporation of Pennsylvania Application November 24, 1934, Serial No. 754,625

1 Claim. (Cl. 167—82)

There are certain drugs of which the therapeutic action is such that they should not be allowed to act simultaneously. An example of such drugs, which are used as vermifuges and directed to the extermination of tape worms and round worms in the alkaline tract of the digestive system of poultry, is kamala and nicotine.

One object of the present invention is to administer such drugs in the form of a single dosage or tablet in which they are compounded in such a way that there is between them a split or delayed action in the desired part or parts of the digestive system.

Another object of the invention is to provide such a tablet devoid of insulating or protective coatings or, in fact, of all coatings except perhaps the exterior finish which serves no purpose whatever in the operation of the tablet or of the drugs contained in it, and which is merely coloring matter and sugar which makes the dose more palatable and the tablet look better.

To these and other ends hereinafter set forth the invention, generally stated, consists in a surface finished split action medicinal tablet devoid of protective coats and consisting of a core and an enveloping crust in contact with each other. Said core and said crust consist of medicaments, and said core including an added binder opposes greater resistance to disintegration in the acid and neutral digestive tracts than the crust.

The invention also comprises the improvements to be presently described and finally claimed.

Figure 1:
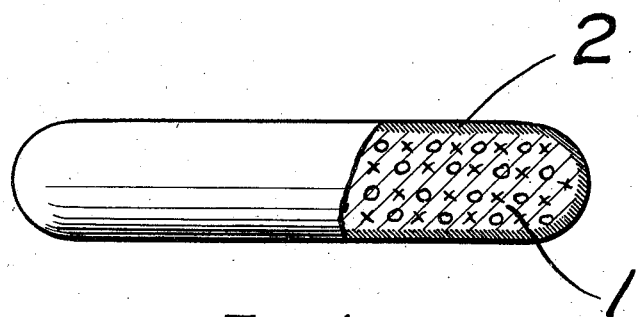
Figure 2:
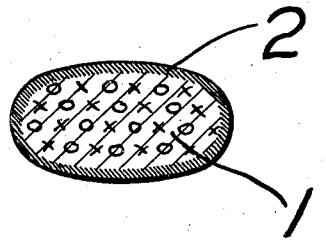

In the following description reference will be made to the accompanying drawing forming part hereof and in which, Figure 1 is a diagrammatic view of a tablet with parts broken away and embodying features of the invention, and Figure 2 is a sectional view of the same taken at right angles to the plane of the section of Figure 1.

Understanding that the invention is not limited to specific drugs, it will be described in connection with kamala and what is known as insoluble nicotine. Insoluble nicotine can be obtained upon the market and it is a nicotine salt characterized by the fact that the active principle, that is the nicotine, is not effective in the neutral and acid tracts of the body but becomes effective in the alkaline tracts of the body through a chemical reaction.

Referring to the drawing, the core 1 consists of kamala, of which the function is to kill tape and other worms and of an added binder, such as gelatine or acacia, and the crust 2 consists of insoluble nicotine, of which the function is to kill large, round and other worms. The core is compressed and is relatively hard.

In the interior of a fowl the operation may be described as follows: The nicotine crust is promptly physically disintegrated, but the nicotine is not released as an active principle in the crop where its effect might be poisonous. This is because the insoluble salt of nicotine is not chemically decomposed in the acid and neutral tract, but the insoluble salt of nicotine passes on to the alkaline tract where its active principle is released by chemical action and there it does its work. The core, however, by reason of its size, shape and density and of its resistance to physical disintegration by reason of the binder, is delayed in the crop and during that delay the nicotine has done its work in the alkaline tract and passed on. Thereafter, the core enters the gizzard where it is most likely ground, but in any event it ultimately reaches the alkaline tract and there the kamala does its work. Thus the action of the tablet is split in point of time so that its ingredients act in the alkaline tract separately and not together, and this split or delayed action may be said to be due to the composition and physical hardness of the core and to the difference in the chemical susceptibility of the crust in neutral or acid solutions and in alkaline solutions of the digestive tract.

It will be obvious to those skilled in the art to which the invention relates that modifications may be made in details of construction, arrangement and point of action of its medicaments without departing from the spirit of the invention which is not limited in respect to such matters or otherwise than as the prior art and the appended claim may require.

I claim:

A surface finished split action medicinal tablet for treatment of an alkaline tract, said tablet being devoid of protective coats and consisting of a core and an enveloping crust in intimate contact with each other, said crust and core containing different medicaments, the medicament of said crust being inactive in the acid and neutral digestive tracts but active in the following alkaline tract, said core including an added binder whereby the core opposes greater resistance to physical disintegration in the acid and neutral digestive tracts than the crust and passage of the core material to the alkaline tract is thereby delayed.

J. WALTER KELLER.